March 18, 1952 H. R. SCHEMM 2,589,968
SELF-UNLOADING VEHICLE BODY
Filed Dec. 23, 1946 3 Sheets-Sheet 2
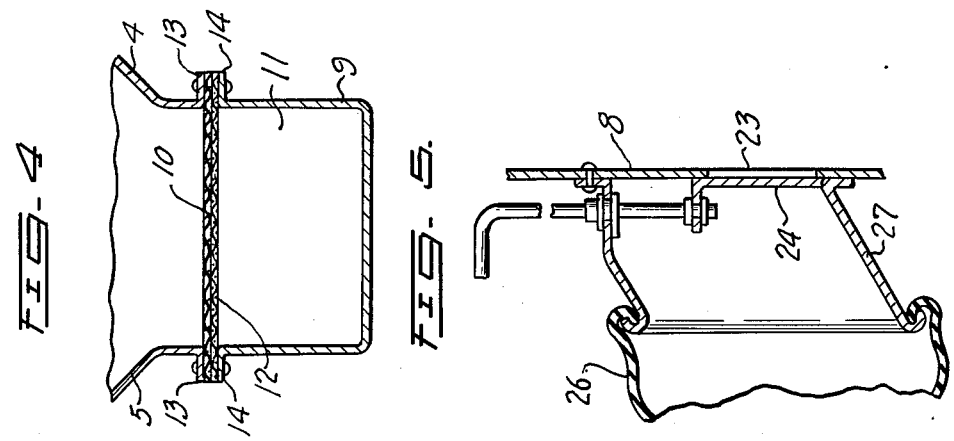
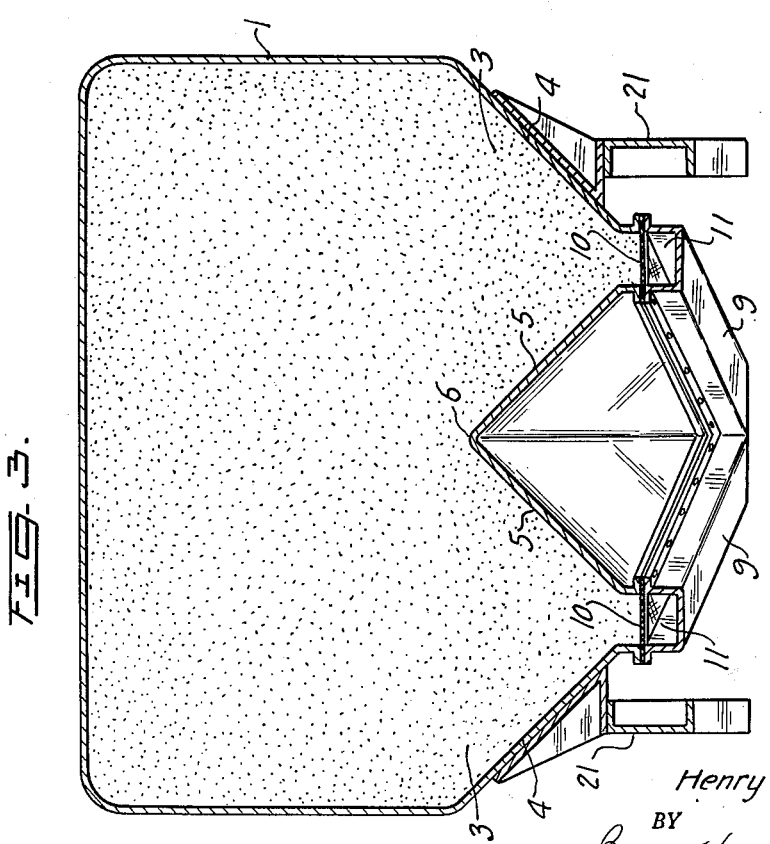
INVENTOR.
Henry Ripley Schemm
BY
ATTORNEYS

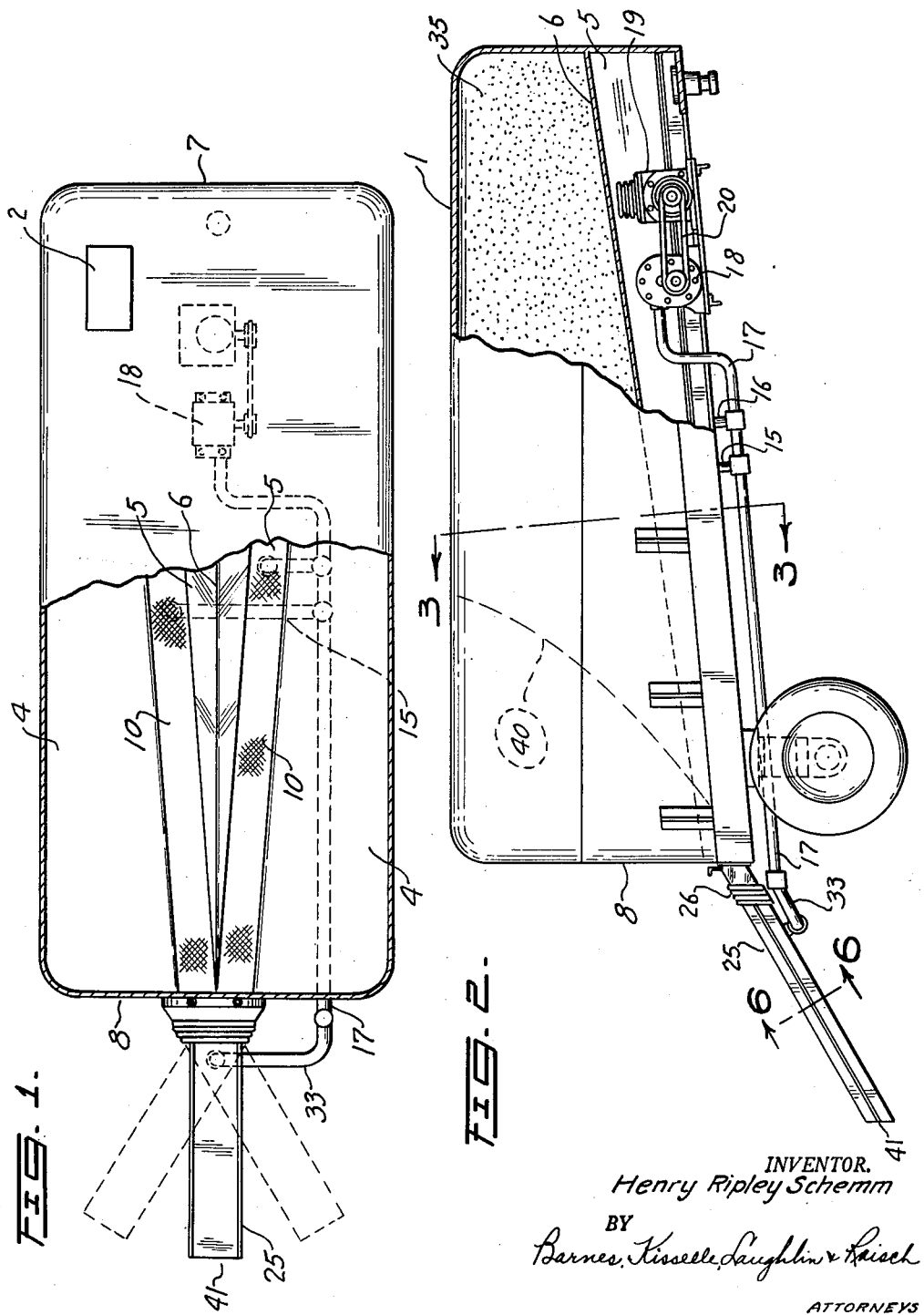

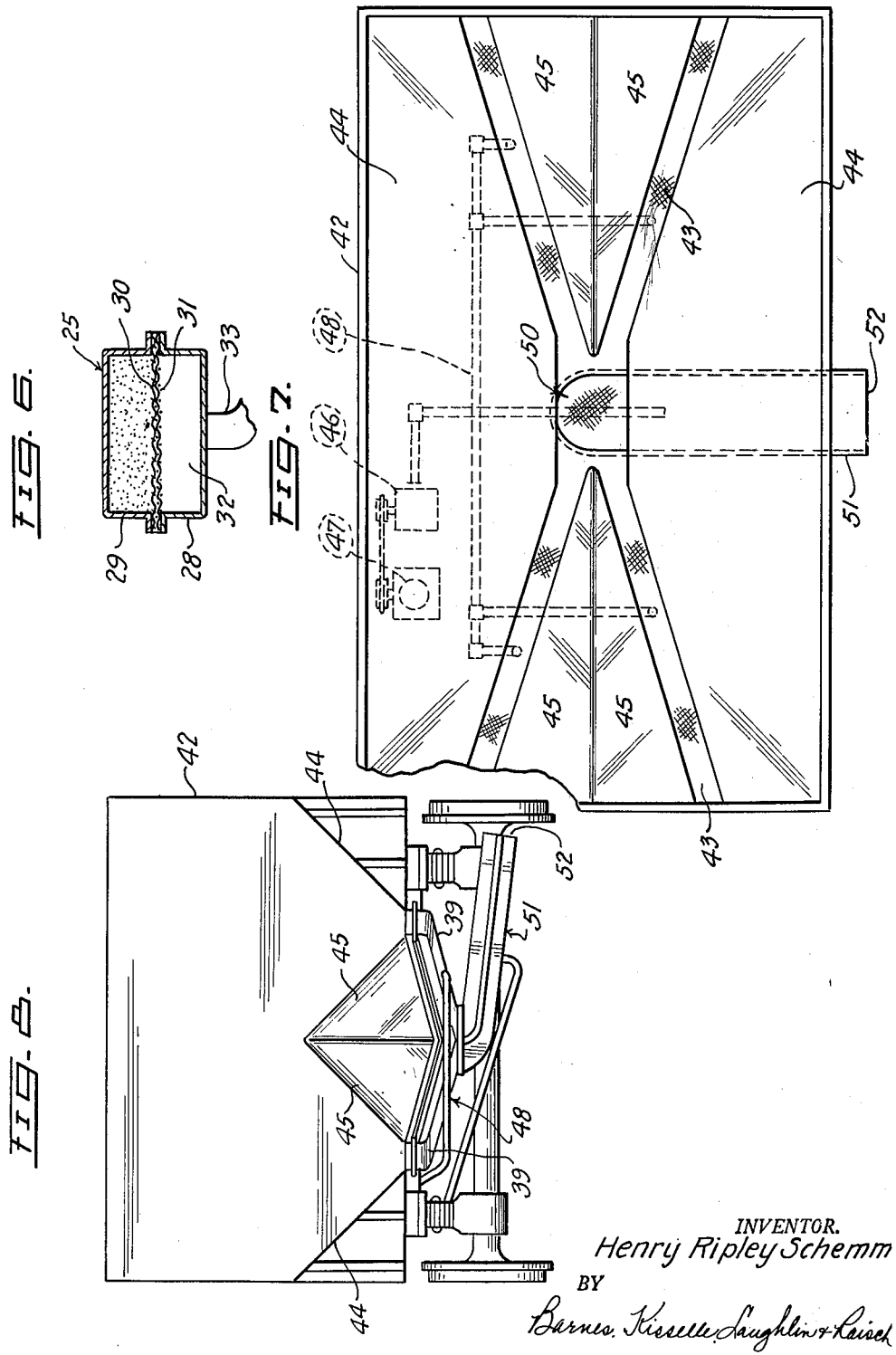

Patented Mar. 18, 1952

2,589,968

UNITED STATES PATENT OFFICE 2,589,968

SELF-UNLOADING VEHICLE BODY

Henry Ripley Schemm, Detroit, Mich., assignor to Huron Portland Cement Company, Detroit, Mich., a corporation of Michigan Application December 23, 1946, Serial No. 717,913

7 Claims. (Cl. 214—83.28)

1

This invention relates to a self-unloading bin for pulverulent material and more particularly to a self-unloading vehicle body such as a truck or trailer or railroad car for bulk cement.

Self-unloading vehicle bodies for transporting bulk pulverulent material, such as cement, are not broadly new. It has been common practice to provide a screw conveyor for unloading bulk cement from such a truck or trailer; the screw conveyor being driven by an auxiliary internal combustion engine mounted on the truck or trailer chassis. The friction inherent in the operation of a screw conveyor requires a relatively rugged drive mechanism and heavy engine having a high horse-power rating. The weight of the screw conveyor driving mechanism and engine appreciably cut down the pay load that could be hauled by such a vehicle.

It is an object of my invention to provide a self-unloading vehicle body for pulverulent material which can carry a greater pay load for the same overall vehicle volume than the screw conveyor type of self-unloading body. This object has been accomplished by providing an unloading mechanism which is lighter in weight, less bulky, and requires only a small fraction of the power to operate the same required by the screw conveyor type of self-unloading body.

My invention also contemplates a self-unloading bin or body of the type mentioned wherein the maintenance and operating costs are appreciably less than those of the screw conveyor type of self-unloading body.

It is also an object of my invention to produce a self-unloading body for pulverulent material which unloads the material efficiently and economically and which facilitates and permits the individual unloading of a truck or trailers in a truck and trailer train or in a railway freight train without uncoupling the individual cars or bodies while unloading the same.

I have found that in comparison with a conventional screw conveyor type of self-unloading body that my unloading mechanism requires only about one-tenth as much horse-power to operate the same and unload the same amount of pulverulent material per unit of time.

In the drawings:

Fig. 1 is a top plan view showing my self-unloading vehicle body with the top partly broken away.

Fig. 2 is a side elevation of the same.

Fig. 3 is a section along the line 3—3 of Fig. 2.

Fig. 4 is a detail section through a conveyor used in my vehicle body,

2

Fig. 5 is a detail of the tail gate or outlet for my vehicle body.

Fig. 6 is a section along the line 6—6 of Fig 2.

Fig. 7 is a top plan view of a self-unloading railway vehicle body for pulverulent material where the body is unloaded from the side rather than rear, and Fig. 8 is a rear elevation of the same.

By way of illustration, I have shown my self-unloading bin in the form of a closed trailer body 1 having a plurality of conveniently located doors 2 through which the pulverulent material, such as cement, is loaded into body 1.

The floor of body 1 comprises two V troughs generally designated 3 extending lengthwise of the body. Each trough 3 comprises an outer wall 4 which is downwardly and inwardly inclined and an inner wall 5 which is downwardly and outwardly inclined. Walls 5 preferably converge as at 6 along the longitudinal center line of the body. Troughs 3 extend throughout the length of the body and their inner walls 5 gradually decrease in height from the front end 7 of body 1 to the rear end 8 of the same. In other words, apex 6 slopes downwardly and rearwardly as shown in Fig. 2.

The bottom of each trough 3 is provided with an air-activated conveyor in the form of a duct 9 which may conveniently be made of sheet metal and which is provided throughout its length with a wall or floor 10 of any porous medium such as filter stone, porous brick, porous rubber, porous porcelain, or woven fabric, such as canvas, which finely divides the air flowing in and through passageway 11. For purposes of description, the porous medium 10 is shown as canvas which is supported or reinforced by a web of woven wire 12. Canvas 10 and woven wire support 12 are clamped at their edges between flanges 13 and 14 of ducts 9 and walls 4 and 5 which are bolted together.

Passageways 11 are connected by branch air lines or ducts 15 and 16 with main duct 17 which connects into the discharge outlet of low-pressure blower 18 which is driven by internal combustion engine 19 through a belt and pulley arrangement generally designated 20. The discharge outlet of blower 18 can be connected into passageways 11 at any point along their length. Passageways 11 preferably extend from the front end 7 to the rear end 8 of body 1 and are of uniform cross section so that the air pressure in passageways 11 is uniform throughout its entire length. Blower 18 and engine 19 are mounted on the vehicle chassis 21 adjacent the front end 7 and between walls 5.

As pointed out in my copending application Serial No. 602,004, filed June 28, 1945, now abandoned, I have found that a powdered material of given composition and fineness, when thoroughly aerated, has a specific and constant angle of repose. By this I mean that, if a quantity of such material is placed in one pile on a horizontal surface and then thoroughly aerated, the mass of material will spread or run along the horizontal surface until its profile assumes a specific angle from horizontal; and that after having reached this angle of repose there will be no further movement regardless of the volume or time of aeration. "Aeration" as used herein means the introduction of air in volume sufficient to flow through the intersticial spaces in the material, but not in volume so great as to mechanically move the material, or any portion thereof (the latter I would term "blowing," not "aeration"). Agitation or blowing of cement wastes power, creates dust, and decreases the efficiency of the conveyor and therefore should be avoided.

From the above fact, which I have determined and verified experimentally, it follows that the angle of repose for a specific pulverulent material is a measure of the force or "head" required to overcome the particle friction of the aerated material. Thus, when I place a quantity of material on a plane surface which is inclined from horizontal at the angle of repose for that material, and thoroughly aerate the material, I find that the entire mass will slowly run down the slope and entirely off the inclined surface. Increasing the slope to slightly more than the angle of repose, greatly increases the velocity of flow of the material, as is to be expected.

Powdered material may, of course, be conveyed in its normal (un-aerated) state by applying sufficient external mechanical force (e. g., screw or drag conveyors). In the present case I am concerned with the conveyance of such material in aerated condition, to gain the advantages inherent in the handling of fluids rather than bulk materials. It then may be said that, to convey powdered material (fully aerated) in a horizontal direction it is necessary to exert a force sufficient to overcome the total of, (a) particle friction of the material, and (b) the frictional resistance of the duct through which the material is conveyed. By using a duct with a slope slightly greater than the angle of repose of the material, the required force may be exerted uniformly on every particle of material throughout the length of the duct. That is, the force of gravity acts on each particle independently, and in the sloping duct this force develops a horizontal component sufficient to overcome the particle friction and frictional resistance of the duct. In the conveying of powdered cement, as herein shown, I have inclined duct 9 and porous wall 10 at an angle of 4.7° to the horizontal which is slightly greater than the angle of repose for powdered cement. This, together with my improved method of aeration, produces a completely successful air activated conveyor.

Rear wall 8 of body 1 is provided with an outlet 23 controlled by a sliding door or valve 24. The troughs 3 converge and terminate at opening 23 through which the powdered or finely divided cement is delivered into an air activated chute 25 which has a flexible connection in the form of a rubber bellows 26 with a discharge spout 27.

Chute 25 is shown in section in Fig. 6 and comprises channel members 28 and 29 which can conveniently be made of sheet metal with a dividing wall therebetween similar to wall 10 and comprising a layer 30 of a porous medium, such as canvas, supported by a web of woven wire 31. Channel 28 forms a duct 32 for air which is connected into main air line 17 by flexible conduit 33 connected to main air line 17 by flexible coupling 34. Due to flexible connection 26 and flexible air line 33, chute 25 can be variously positioned to deliver the powdered cement either in back or to the side of body 1.

The operation of my self-unloading vehicle body is as follows: The powdered cement 35, or other dry pulverulent or finely divided material, is loaded into the body 1 and, of course, is supported upon chute walls 4 and 5 and porous medium 10. Engine 19 is set in operation and the blower 18 supplies air at very low pressures, for example, from .8 to 2 pounds per square inch. Such pressure is sufficient to aerate the cement and cause it to flow even though there is a substantial load of dead cement against the aerator cloth. In an actual embodiment of my invention the fan delivered 4.4 cubic feet per minute per square foot of canvas 10 at one pound pressure and the total area of canvas 10 was 24 square feet. The total air required was 105 cubic feet per minute at one pound pressure. Engine 19 was a small three horse-power engine whereas for a similar installation with a screw conveyor a forty horse-power engine was required.

The air flowing into ducts 11 aerates the cement and causes it to flow out of opening 23. The cement unloads beginning from the rear end 8 of the vehicle body and progressing forwardly. Since porous medium 10 is inclined from the front of the vehicle downwardly and rearwardly at an angle of about 5°, which is slightly greater than the angle of repose of the aerated cement, the cement flows somewhat similarly to liquid.

As the cement unloads from the rear end forwardly, it breaks away, as indicated by the dotted line 40, but canvas 10 is always covered with a layer of aerated flowing powdered cement from end to end until the unloading operation is completed. If chute 25 is used, then during the unloading operation air is also delivered through lines 17 and 33 into duct 32 and passes through porous medium 30 to aerate the cement in chute 25. Thus, chute 25 acts as an air conveyor and delivers the cement out of discharge end 41 which can be positioned either directly to the rear of the vehicle or to either side or at any intermediate point.

In Fig. 8 I have shown a railway car having a closed body 42 provided with a plurality of air ducts 39 similar to ducts 11 and covered with a porous medium 43 of canvas. The bottom side walls 44 of the railway car are inclined downwardly and inwardly to ducts 43 and the intermediate walls 45 are inclined downwardly and outwardly to ducts 43. Thus, walls 44 and 45 cooperate to form troughs for directing the powdered cement on to air-activated conveyor 43. The porous walls 43 are inclined toward a central opening 50 in the bottom of the car at an angle of about 5°, that is, slightly more than the angle of repose of the aerated cement.

Air is supplied to conveyors 43 and chute 51 by blower 46 (driven by internal combustion engine 47) through a series of pipe lines designated 48. Conveyor chute 51 is constructed identically with chute 25 so that as the cement travels down conveyors 43 and flows through opening 50 into conveyor 51 and then downwardly through conveyor 51 and out of discharge end 52.

From the above it is evident that I have produced a self-unloading vehicle body for pulverulent material which is lighter, carries a greater pay load, requires less maintenance and is cheaper to operate than the self-unloading vehicle bodies for pulverulent material now in practical use and shown in the prior art.

Passageway 11 is continuous and has the same cross-sectional area from one end to the other of body 1 so that the air pressure in passageway 11 is uniform throughout its entire length and the air flows through porous medium 10 at a substantially uniform rate throughout its length.

"Aeration" is herein used in its generic sense to cover mixing the powdered cement or pulverulent material with any suitable gas.

In unloading, as long as aeration of the cement continues, the cement adjacent outlet 23 is discharged first and then the body of cement breaks away from rear to front of body 1 gradually and progressively and slides down trough 3 onto or above porous wall 11 and flows downwardly toward and through outlet 23.

I claim:

1. In a vehicle adapted to receive and transport pulverulent material, a discharge outlet in said vehicle, a porous wall in the bottom of said vehicle, an air chamber beneath said porous wall, said porous wall being of woven fabric and inclined downwardly toward said discharge outlet at an angle at least equal to the angle of repose of said material when aerated, a chute connected to the discharge outlet for conveying pulverulent material from the vehicle, the chute being movable to a position in which the conveying surface thereof is inclined at an angle at least equal to the angle of repose of said material when aerated, substantially the entire length and width of the conveying surface of the chute being a porous woven fabric wall, an air chamber extending beneath said latter porous wall, and means for causing a gaseous medium to flow into said air chambers and through said porous walls in the vehicle and chute to aerate pulverulent material overlying them, whereby such overlying material flows along said porous walls.

2. In a self-unloading bin for a mass of pulverulent material, a pair of end walls, side walls, a discharge outlet adjacent the bottom of one of said end walls, a plurality of elongated porous bottom walls extending from said outlet in the one end wall to the opposite end wall, said porous bottom walls diverging from said outlet, said porous bottom walls being inclined downwardly toward said outlet at an angle at least equal to the angle of repose of said material when aerated, a pair of walls between the said converging bottom walls, one wall of said pair of walls having its lower edge adjacent and co-extensive with the inner longitudinal edge of one of said porous walls and the other wall of said pair of walls having its lower edge adjacent and co-extensive with the inner edge of the other porous bottom wall, said pair of walls being inclined upwardly and toward each other from their respective porous walls and meeting on a line intermediate said porous walls, said pair of walls each being inclined upwardly at an angle such that the pulverulent material when unaerated flows by gravity down said inclined wall on to the porous walls, and means for forcing a gaseous medium through said porous walls to aerate the pulverulent material upon said porous walls whereby the aerated pulverulent material flows along said porous bottom walls toward and out of said outlet.

3. The combination claimed in claim 2 wherein the line of convergence of said pair of walls terminates substantially at said outlet and is inclined upwardly therefrom, the side walls inclined upwardly and outwardly from the outer longitudinal edges of said porous bottom walls at an angle such that the pulverulent material when unaerated or in its normal state flows by gravity down said inclined side walls onto the respective porous walls, and the inclined side walls and the porous bottom walls having substantially the same length.

4. A self-unloading vehicle adapted to receive and transport a mass of pulverulent material comprising in combination a vehicle body adapted to receive said mass of material, a floor for said body comprising a V trough the sides of which are inclined at an angle such that the pulverulent material flows by gravity down said inclined sides, the bottom of said trough comprising a porous medium of woven fabric and being inclined lengthwise of said trough at an angle at least equal to the angle of repose of said pulverulent material when aerated but at an angle less than the angle of repose of the material when unaerated or in its normal state, an outlet at the lower end of said porous bottom, a chute connected to said discharge outlet for conveying pulverulent material from the vehicle, the chute being movable to a position in which the conveying surface thereof is inclined at an angle at least equal to the angle of repose of said material when aerated, substantially the entire length and width of the conveying surface of the chute being a porous woven fabric wall, a duct extending beneath said porous wall, said porous wall forming at least a portion of the top wall of the duct, and means for forcing gas through the porous bottom of said V trough and through the porous wall of the chute to aerate said pulverulent material, whereby said material flows along said porous bottom of the V trough through said outlet and onto and downwardly along the conveying surface of said chute.

5. In a self-unloading bin for a body of pulverulent material, a plurality of side walls, a porous bottom wall of woven fabric inclined downwardly at an angle at least equal to the angle of repose of said material when aerated, at least one side wall having its lower edge adjacent one of the longitudinal edges of said porous wall, said side wall being inclined upwardly and outwardly from the longitudinal edge of said porous wall at an angle such that the pulverulent material when unaerated flows by gravity down said inclined wall onto the porous wall, an outlet at the lower end of said porous wall, means for causing a gaseous medium to flow through said porous wall to aerate pulverulent material thereon, whereby such aerated pulverulent material flows along said porous bottom wall toward and out of said outlet, a chute connected to the discharge outlet for conveying pulverulent material from the vehicle, the chute being movable to a position in which the conveying surface thereof is inclined at an angle at least equal to the angle of repose of said material when aerated, substantially the entire length and width of the conveying surface of the chute being a porous woven fabric wall, and to cause it to flow along said surface when it is inclined at said angle.

6. In a self-unloading bin for a body of pulverulent material, a plurality of side walls, a porous bottom wall inclined downwardly at an angle at least equal to the angle of repose of said material when aerated, said porous bottom wall being of woven fabric having a permeability such that at a pressure differential across the fabric of from 0.8 to 2 pounds of pressure per square inch about 4.4 cubic feet of gas per minute per square foot passes therethrough, at least one side wall having its lower edge adjacent one of the longitudinal edges of said porous wall, said side wall being inclined upwardly and outwardly from the longitudinal edge of said porous wall at an angle such that the pulverulent material when unaerated flows by gravity down said inclined wall onto the porous wall, an outlet at the lower end of said porous wall, and means for causing a gaseous medium to flow through said porous wall to aerate the pulverulent material thereon, whereby the aerated pulverulent material flows along said porous bottom wall toward and out of said outlet.

7. A self-unloading bin for pulverulent material comprising a plurality of side walls, a porous bottom wall of woven fabric inclined downwardly at an angle at least equal to the angle of repose of the pulverulent material when aerated, at least one of said side walls having its lower edge adjacent one of the longitudinal edges of said porous wall, said side wall being inclined upwardly and outwardly from the adjacent longitudinal edge of said porous wall at an angle such that the pulverulent material when unaerated flows by gravity down said inclined wall and onto the porous wall, the bin having an outlet at the lower end of said porous wall, and means for causing a gaseous medium to flow through said porous wall to aerate pulverulent material thereon, whereby the aerated pulverulent material flows along said porous bottom wall toward and out of said outlet.

HENRY RIPLEY SCHEMM.

REFERENCES CITED

The following references are of record in the file of this patent:

UNITED STATES PATENTS

| Number | Name | Date |
|---|---|---|
| 608,585 | Dentler | Aug. 9, 1898 |
| 1,029,273 | Butler | June 11, 1912 |
| 1,429,387 | Weber | Sept. 19, 1922 |
| 1,465,665 | Grindle | Aug. 21, 1923 |
| 1,971,852 | Goebels | Aug. 28, 1934 |
| 1,971,853 | Ihlefeldt | Aug. 28, 1934 |
| 2,032,367 | Kennedy et al. | Mar. 3, 1936 |
| 2,219,283 | Horn | Oct. 29, 1940 |
| 2,316,814 | Schemm | Apr. 20, 1943 |
| 2,337,667 | Kuehlman | Dec. 28, 1943 |

FOREIGN PATENTS

| Number | Country | Date |
|---|---|---|
| 808,124 | France | Nov. 6, 1936 |